No. 875,445.
PATENTED DEC. 31, 1907.
A. MEIERHOFF & H. C. BECKMANN.
EARTH LOADING MACHINE.
APPLICATION FILED JULY 1, 1907.
4 SHEETS—SHEET 1.
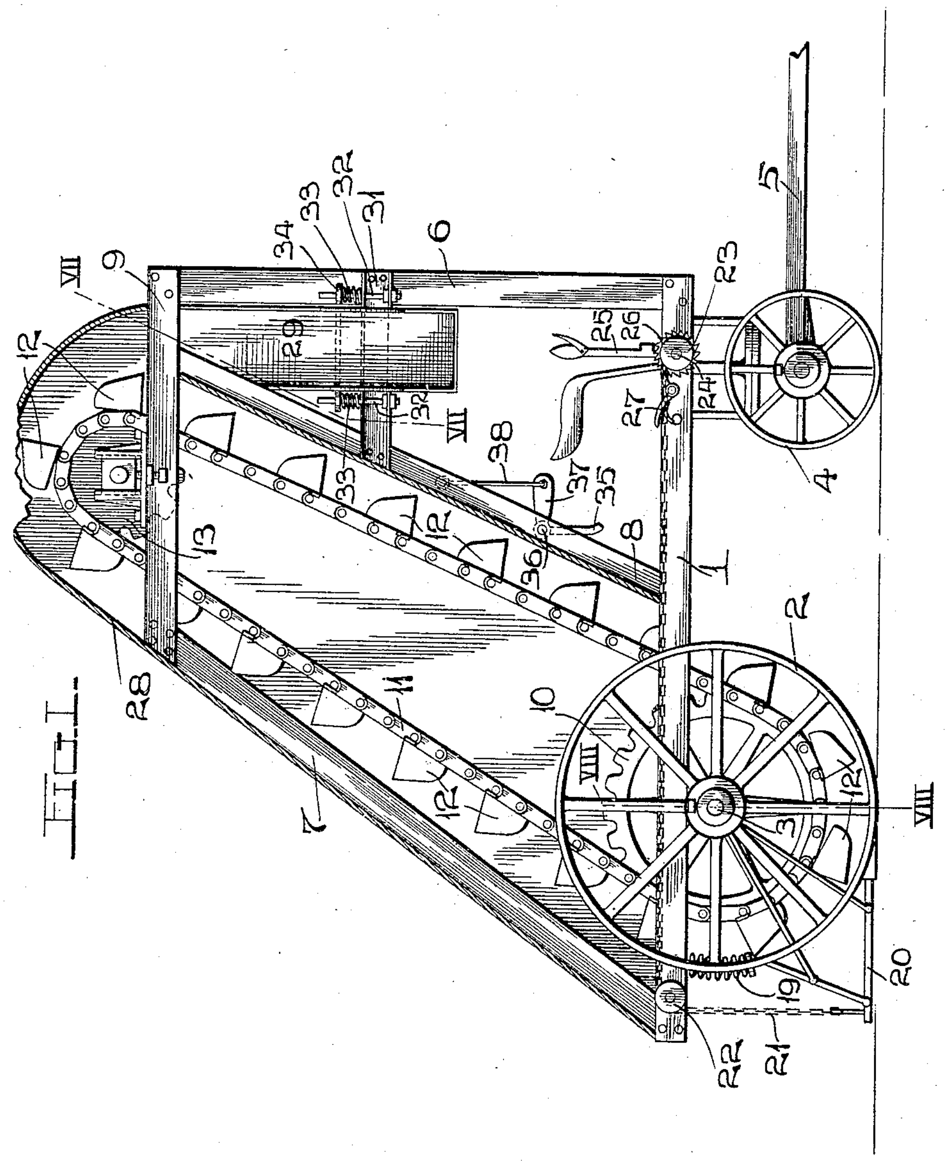
FIG. I.
ATTEST.
H. G. Fletcher.
Lily Rost
INVENTORS.
ADOLF MEIERHOFF.
HENRY C. BECKMANN.
BY Geo. H. Knight
ATT'Y.
THE NORRIS PETERS CO., WASHINGTON, D. C.

No. 875,445. PATENTED DEC. 31, 1907.
A. MEIERHOFF & H. C. BECKMANN.
EARTH LOADING MACHINE.
APPLICATION FILED JULY 1, 1907.
4 SHEETS—SHEET 2.
FIG. II.
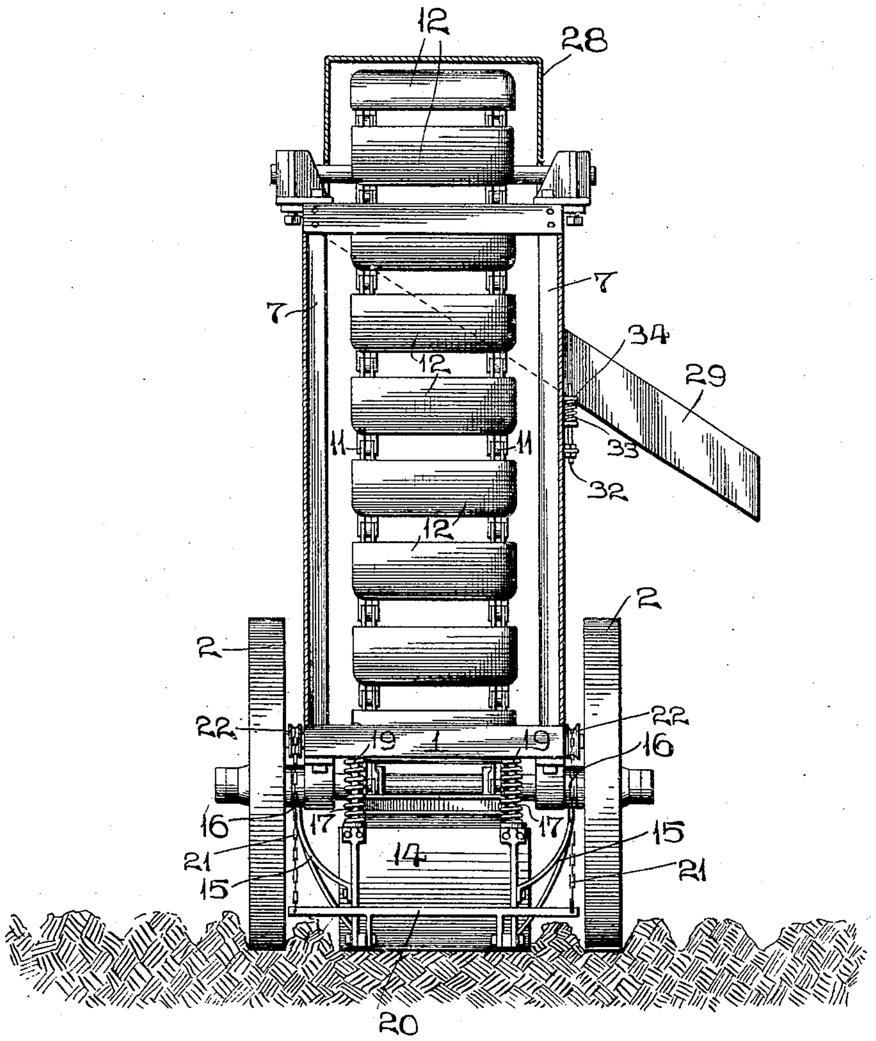
ATTEST.
H. J. Fletcher.
Lily Rost
INVENTORS.
ADOLF MEIERHOFF.
HENRY C. BECKMANN.
BY Geo. H. Knight
ATT'Y.
THE NORRIS PETERS CO., WASHINGTON, D. C.

A. MEIERHOFF & H. C. BECKMANN.
EARTH LOADING MACHINE.
APPLICATION FILED JULY 1, 1907.
4 SHEETS—SHEET 3.
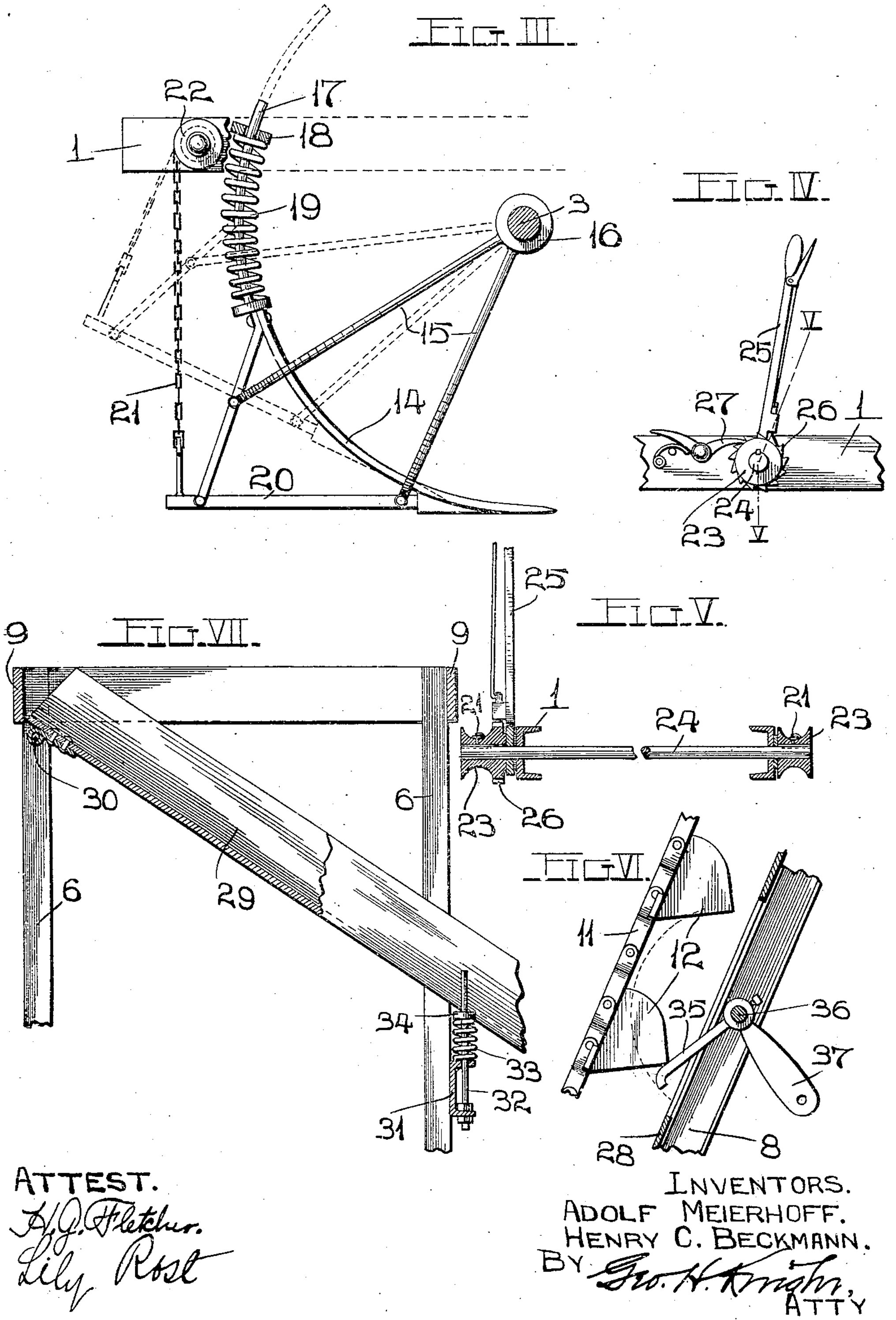
FIG. III, FIG. IV, FIG. V, FIG. VI, FIG. VII
ATTEST.
H. J. Fletcher.
Lily Rost
INVENTORS.
ADOLF MEIERHOFF.
HENRY C. BECKMANN.
BY Geo. H. Knight,
ATTY
THE NORRIS PETERS CO., WASHINGTON, D. C.

No. 875,445. PATENTED DEC. 31, 1907.
A. MEIERHOFF & H. C. BECKMANN.
EARTH LOADING MACHINE.
APPLICATION FILED JULY 1, 1907.
4 SHEETS—SHEET 4.
FIG. VIII.
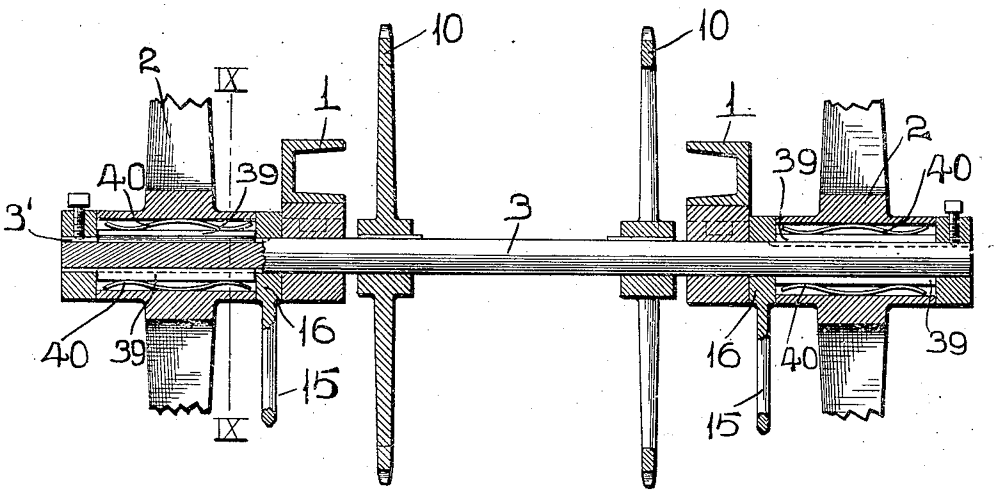
FIG. IX.
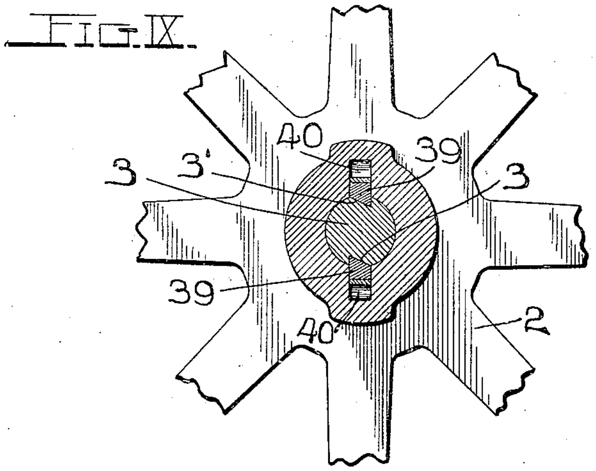
FIG. X.
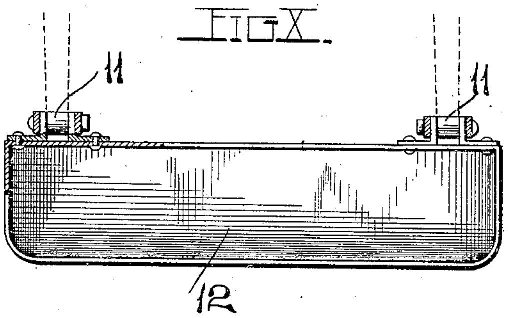
ATTEST.
H. J. Fletcher.
Lily Rost
INVENTORS.
ADOLF MEIERHOFF.
HENRY C. BECKMANN.
BY Geo. H. Knight
ATT'Y.
THE NORRIS PETERS CO., WASHINGTON, D. C.

UNITED STATES PATENT OFFICE.

ADOLF MEIERHOFF AND HENRY C. BECKMANN, OF ST. LOUIS, MISSOURI, ASSIGNORS TO CHARLES KUNKEL, JR., OF ST. LOUIS, MISSOURI.

EARTH-LOADING MACHINE.

No. 875,445. Specification of Letters Patent. Patented Dec. 31, 1907.

Application filed July 1, 1907. Serial No. 381,588.

*To all whom it may concern:*

Be it known that we, Adolf Meierhoff and Henry C. Beckmann, citizens of the United States of America, residing in the city of St. Louis and State of Missouri, have invented certain new and useful Improvements in Earth-Loading Machines, of which the following is a full, clear, and exact description, reference being had to the accompanying drawings, forming part of this specification.

Our invention relates to an improvement in earth loading machines, the present machine being one more particularly intended for use in gathering clay for the manufacture of bricks and delivering it into wagons on which it is conveyed to any desired point at which it is to be utilized.

The invention has for one of its objects to produce a machine of the character named by which the earth may be gathered in a highly efficient manner, due to the particular mounting of the scraper by which the earth is gathered to be caught and elevated by an elevator operable adjacent to said scraper.

Another object of the invention is to provide means whereby the delivery chute of the machine is yieldingly supported in order that it will be continually vibrated, due to the delivery of earth thereinto, thereby preventing clogging of said chute.

Another object of the invention is to provide means whereby the elevator buckets of the machine are struck when in inverted positions for the purpose of dislodging therefrom any earth that may adhere to them and which impairs their capacity.

Figure I is a side elevation of our machine with the elevator housing shown in vertical longitudinal section. Fig. II is a rear elevation of the machine with the elevator housing shown in vertical cross section. Fig. III is an enlarged elevation of the scraper of the machine. Fig. IV is an enlarged elevation of the lifting mechanism to which the scraper is connected. Fig. V is a cross section taken through the frame of the machine and the scraper lifting mechanism on line V—V, Fig. IV. Fig. VI is an enlarged elevation of two of the elevator buckets and the knocker by which the elevator buckets are struck during their downward movement. Fig. VII is an enlarged view partly in elevation and partly in section taken on line VII—VII, Fig. I, of the delivery chute and the members by which said chute is supported. Fig. VIII is an enlarged vertical cross section taken on line VIII—VIII, Fig. I. Fig. IX is an enlarged cross section taken on line IX—IX, Fig. VIII. Fig. X is a top or plan view of one of the elevator buckets with the elevator chain by which the buckets are carried shown in cross section.

1 designates the running gear frame of our machine. This frame is supported by a pair of rear ground wheels 2, a rear axle 3 mounted therein and steering wheels 4 that have connected to them a draft tongue 5. The running gear frame has mounted upon it a framework comprising forward stanchions 6, rear stanchions 7 and intermediate stanchions 8, and ties 9 by which said stanchions are supported.

The rear axle of the machine is loosely mounted in the running gear frame and has keyed to it a pair of sprocket wheels 10 engaged by a pair of endless elevator chains 11 bearing buckets 12 and which operate upon sprocket wheels 13 supported at the top of the framework mounted on the running gear frame and which chains operate during the rotation of the axle 3.

14 designates a curved scraper shoe that is supported between the rear ground wheels 2 by hangers 15 which are provided with hubs 16 loosely fitted to the rear axle 3 and through the medium of which said scraper shoe is supported in juxtaposition to the path of travel of the elevator buckets 12 during the earth gathering action of said buckets while they are traveling near the ground and beginning their ascent after they are filled with the earth that has been gathered upon the scraper shoe ready to be caught by the buckets. The scraper shoe is swingingly supported relative to the rear axle 3, due to the pivotal mounting of the hanger arms 15 upon said axle, this pivotal mounting being the one employed for the scraper shoe in order that the shoe may partake of a rise and fall motion in an arc of a circle when it encounters any obstruction it is necessary for it to pass over. The shoe is also pivotally supported in order that it may be elevated from the ground and held with its point or nose in an uplifted position above the ground during the transportation of the machine from one place to another. We desire to here direct particular attention to the fact that by mounting the shoe as explained so that its point of pivotal support or axis corresponds to the axis of the rear axle 3 and the elevator operating sprocket wheels 10 fixed to said axle, the shoe is always maintained in the same relation to the elevator buckets while said buckets are passing the shoe in their positions in which they receive the earth that has been gathered by the scraper shoe. Provision is therefore made for the buckets constantly passing in front of the scraper shoe in such manner as to cause them to receive uniform loads or quantities of earth from the scraper shoe.

17 are guide rods that project upwardly from the upper and rear end of the scraper shoe and the movement of which is directed by a guide bar 18 through which said rods extend, as seen in Fig. III. The scraper shoe is normally but yieldingly restrained in a lowered position for earth gathering action by springs 19 located between the upper end of the scraper shoe and the guide bar 18.

To provide for the lifting of the scraper from the ground when an obstruction is to be cleared or the scraper is to be upheld out of service for the time being we produce an extension frame 20 at the rear of the scraper shoe and connect to this extension frame a pair of lift chains 21 that extend upwardly to the running gear frame of the machine, over the sheaves 22 and then forwardly to the front of the machine. These lift chains are connected to drums 23 that are carried by a winding shaft 24 journaled in the running gear frame.

25 is a hand lever that is mounted upon the winding shaft adjacent to one of the drums 23 and which is provided with a pawl adapted to engage the teeth of a ratchet wheel 26 carried by or forming a part of the adjacent drum.

27 is a spring controlled pawl mounted upon the running gear frame that, by engagement with the ratchet wheel 26, serves to prevent retrograde rotation of the winding shaft and its drum when the lift chains 21 are being wrapped around the drums and after they have been wrapped therearound.

28 designates a housing within which the bucket elevator of our machine operates above the running gear of the machine.

29 is a delivery chute into which the earth is discharged by the elevator buckets when they reach the upper end of their course of travel and through which the earth is conducted to be discharged into a wagon-bed or other receptacle in which the earth is to be loaded. The upper end of this chute is hinged at 30 to members of the framework carried by the running gear of the machine from which point the chute extends in a downwardly inclined direction.

31 is a bracket secured to members of the framework carried by the running gear and located beneath the chute 29. In this bracket are mounted a pair of vertical posts 32 that are surrounded by springs 33 that are surmounted by a bar 34 which is loosely fitted to the guide rods 32 and is adapted to move vertically thereon. The bar 34 is positioned immediately beneath the delivery chute 29 and by resting upon the springs 33 furnishes yielding support for said chute that permits of its rising and falling when the earth is discharged from the elevator buckets into the chute with the result that the chute is kept constantly in motion while the earth is falling thereinto and passing downwardly therethrough and the earth is prevented from becoming clogged in the chute.

In the use of a bucket elevator in an earth loading machine the buckets become frequently clogged or partially clogged, due to the adhesion of the moist earth to them and their capacity is therefore impaired. To overcome this impairment we provide a knocker which consists of an arm 35, see Figs. I and VI, which is mounted upon a pivot pin 36 attached to one of the intermediate stanchions 8 of the framework supported by the running gear of the machine and a weight arm 37 which acts to normally throw the arm 35 in an upward direction. The knocker arm 35 is normally in the path of downward travel of the elevator buckets 12 so that said buckets will strike said arm and move it downwardly as each bucket moves into juxtaposition with the arm. When each bucket strikes the knocker arm and moves it downwardly it acts to move the weight arm of said knocker upwardly as illustrated in Fig. VI and immediately after the bucket has become disengaged from the knocker arm the weight arm of the knocker, by moving downwardly, causes the arm 35 to be thrown upwardly and strike the next succeeding elevator bucket with sudden impact and sufficient force to jar from it the earth that is adhering to the bucket. When the knocker just described is not needed for service it is held so that its arm 35 is retracted out of the path of travel of the elevator buckets by any suitable means, such as a hanger hook 38 that is attached to the framework member bearing the knocker and which is adapted to be placed in engagement with the knocker, as seen in Fig. I.

It is of importance in our earth loading machine that the rear ground or driving wheels of the machine be so fitted to the axle mounted therein that either wheel may turn independently of the other upon the axle when the machine is being turned when traveling in a curving direction in order that there shall be no conflict between the travel of the wheels while one is moving more slowly than the other in accomplishing the turn or curve. We avoid any such conflict by providing the rear axle of the machine with grooves or pawl seats 3′ extending longitudinally of the spindles of the axle, see Figs. VIII and IX, and mounting within the hub of each rear ground wheel pawls 39 that are backed by springs 40 and are adapted to occupy the grooves or pawl seats in the axle spindles. The grooves or pawl seats in the axle spindles are beveled and the pawls are also beveled, see Fig. IX, and it will be readily understood that when one of the ground wheels travels a greater distance than the other ground wheel, the rear axle will be turned by the first mentioned wheel while it will rotate idly within the other wheel during which action the pawls in the hub of the last mentioned wheel will move out of and into the pawl seats in the corresponding axle spindle to resume their normal positions only after the ground wheels have taken up an even travel and the machine is traveling in a straight course.

We claim:

1. In an earth loading machine, the combination of a running gear frame, an axle supporting said running gear frame, a bucket elevator operable around said axle and driven thereby, and a scraper pivotally connected to said axle and having a shoe movable in a path corresponding to the path of travel of said elevator while moving adjacent to the shoe, substantially as set forth.

2. In an earth loading machine, the combination of a running gear frame, an axle supporting said running gear frame, a bucket elevator operable around said axle and driven thereby, and a spring controlled scraper pivotally connected to said axle and having a shoe movable in a path corresponding to the path of travel of said elevator while moving adjacent to the shoe, substantially as set forth.

3. In an earth loading machine, the combination of a running gear frame, an axle supporting said running gear frame, a bucket elevator operable around said axle and driven thereby, a scraper pivotally connected to said axle and having a shoe movable in a path corresponding to the path of travel of said elevator while moving adjacent to the shoe, and means for elevating said scraper, substantially as set forth.

4. In an earth loading machine, the combination of a running gear frame, an axle supported by said running gear frame, a bucket elevator operable around said axle and driven thereby, a scraper pivotally connected to said axle, guide rods carried by said scraper, and a guide bar supported by said running gear frame and in which said guide rods operate, substantially as set forth.

5. In an earth loading machine, the combination of a running gear frame, an axle supported by said running gear frame, a bucket elevator operable around said axle and driven thereby, a scraper pivotally connected to said axle, guide rods carried by said scraper, a guide bar supported by said running gear frame and in which said guide rods operate, and springs surrounding said guide rods and located between said scraper and guide bar, substantially as set forth.

6. In an earth loading machine, the combination of a running gear, a frame supported by said running gear, an elevator supported by said running gear, and frame, and a spring supported delivery chute connected to said frame, substantially as set forth.

7. In an earth loading machine, the combination of a running gear, a frame supported by said running gear, an elevator supported by said running gear and frame, a delivery chute hinged to said frame at its upper end, and a spring controlled member supporting the lower portion of said chute, substantially as set forth.

8. In an earth loading machine, the combination of a running gear, a frame supported by said running gear, an elevator supported by said running gear and frame, a delivery chute hinged to said frame at its upper end, guide rods supported by said frame, springs surrounding said guide rods, and a bar supported by said springs and serving to support the lower portion of said chute, substantially as set forth.

9. In an earth loading machine, the combination of a running gear, an elevator supported by said running gear and comprising carrier members and buckets, and a pivotally mounted knocker disposed in the path of travel of said buckets, substantially as set forth.

10. In an earth loading machine, the combination of a running gear, an elevator supported by said running gear and comprising carrier members and buckets, and a pivotally mounted weighted knocker disposed in the path of travel of said buckets, substantially as set forth.

ADOLF MEIERHOFF.
HENRY C. BECKMANN.

In presence of—
HY. KUHLMEYER,
E. A. NUELLE.